United States Patent [19]

Ercoli et al.

[11] 3,857,941
[45] Dec. 31, 1974

[54] PHARMACEUTICAL COMPOSITIONS AND USE OF PREDNISOLONE 17-BENZOATE

[75] Inventors: Alberto Ercoli, Milan; Rinaldo Gardi, Carate Brianza; Romano Vitali, Casatenovo, all of Italy

[73] Assignee: Warner-Lambert Company, Morris Plains, N.J.

[22] Filed: May 25, 1973

[21] Appl. No.: 364,219

Related U.S. Application Data

[63] Continuation-in-part of Ser. No. 48,481, June 22, 1970, Pat. No. 3,755,302.

[52] U.S. Cl............................ 424/243, 260/397.45
[51] Int. Cl............................................ A61k 17/00
[58] Field of Search................ 424/243; 260/397.45

[56] References Cited
UNITED STATES PATENTS
2,837,464   6/1958   Nobile .................................. 195/51

3,152,154   10/1964   Ercoli et al. .................... 260/397.45
3,529,060   9/1970   Ercoli et al. ......................... 424/243
3,755,302   8/1973   Ercoli et al. ......................... 424/243

OTHER PUBLICATIONS

"Steroids," No. 16, (1970), Pages 663–678.

Primary Examiner—Elbert L. Roberts
Attorney, Agent, or Firm—Albert H. Graddis; Frank S. Chow; Anne M. Kelly

[57]  ABSTRACT

A method and compositions for producing anti-inflammatory effects by administration of an effective amount of prednisolone 17-benzoate. This compound exhibits a highly desirable degree of topical and systemic activity and also shows a sustained effect when subcutaneously administered.

6 Claims, No Drawings

PHARMACEUTICAL COMPOSITIONS AND USE OF PREDNISOLONE 17-BENZOATE

CROSS - REFERENCE TO RELATED APPLICATION

This application is a continuation-in-part of our co-pending application U.S. Ser. No. 48,481, filed June 22, 1970, now U.S. Pat. No. 3,744,302.

BACKGROUND OF THE INVENTION

1. Field of the Invention

This invention relates to pharmaceutical compositions containing prednisolone 17-benzoate incorporated in a topical or systemic pharmaceutical carrier and to the use of such compositions for topical and systemic treatment of inflammatory conditions in animals and humans.

2. Description of the Prior Art.

It is known that the anti-inflammatory effect in corticoids of the prednisolone series may be selectively enhanced for topical application by conversion to 17-monoesters. However, for systemic administration, the free alcohol or the 21-ester thereof is still the optimal configuration. 17-Monoesterification does not influence the oral or parenteral activity of the parent free alcohol and is usually accompanied by a reduced systemic potency.

DESCRIPTION OF THE INVENTION

We have found that the 17-benzoate of prednisolone, a compound still undisclosed in the art, has the unusual property of being highly effective as anti-inflammatory agent both for topical and systemic use. in our biological assays, this compound proved to be significantly more potent than prednisolone free alcohol not only when locally or topically applied but also when administered systemically.

The local activity of prednisolone 17-benzoate, as measured in the granuloma pouch assay, was found to be at least 50 times greater than that of the parent alcohol and its potency, in the systemic assays, was about 10 times that of the free alcohol. This increase in the systemic potency is shown when the 17-benzoate of prednisolone is administered orally or parenterally. In addition, the compound exhibits a prolonged effect when subcutaneously administered. Thus, the 17-benzoate of prednisolone shows a highly desirable degree of topical and systemic activity with the added property of having a sustained effect.

The compositions of this invention comprise the 17-benzoate of prednisolone in combination with conventional pharmaceutical carriers or bases. These therapeutically useful compositions can be used in several pharmaceutical forms according to the way of administration, e.g., by oral, parenteral or intra-articular route or by topical application. Thus, the active ingredient may be compounded with the usual carriers for the preparations of dosage forms, such as pills, tablets, capsules, syrups and elixirs, aqueous suspensions or emulsions, oily solutions or other forms particularly fit for systemic use in corticosteroid therapy.

The compositions for oral use may contain one or more conventional adjuvants, such as sweetening agents, flavoring agents, coloring agents and preserving agents in order to provide palatable preparations. Tablets may contain the active ingredient in admixture with conventional pharmaceutically acceptable excipients, e.g. inert diluents, such as calcium carbonate, sodium carbonate, lactose and talc, granulating and disintegrating agents, binding agents and lubricating agents, such as magnesium stearate, calcium stearate, stearic acid and the like. The tablets may be uncoated or coated by known techniques to delay disintegration and adsorption in the gastrointestinal tract and thereby provide a sustained action over a longer period. Capsules may contain the active ingredient alone or admixed with an inert solid diluent, e.g., calcium carbonate, magnesium stearate, lactose and the like.

Similarly, suspensions, syrups and elixirs may contain the active ingredient in admixture with any of the conventional excipients utilized for the preparation of such compositions, e.g. suspending agents (methylcellulose, carboxymethyl cellulose, sodium alginate), wetting or lubricating agents (lecithin, polyoxyethylene glycols and polyoxyethylene sorbitan mono-oleate), preservatives (ethyl-p-hydroxy-benzoate), or buffer systems to preserve the active ingredient.

The injectable compositions are formulated as known in the art and may contain appropriate dispersing or wetting agents and suspending agents identical or similar to those mentioned above.

For topical application, the active ingredient may be incorporated in the usual compatible vehicles utilized for the production of ointments, lotions, creams, emulsions, drops, sprays, suppositories and aerosols, as it is well known in the pharmaceutical art. Ointments may be formulated, for example, for both hydrophilic and hydrophobic applications and when lotions are formulated they may comprise aqueous or non-aqueous bases. The pharmaceutical carriers which can be used for these topical formulations are, for example, fats, vegetable oils, fatty acids, alcohols, poly-alkylene glycols, waxes, petrolatum, polyesters and the like, and may be combined with water and gelling agents when compatible.

The 17-benzoate of prednisolone is contained in the pharmaceutical compositions of this invention in an amount sufficient to produce the desired therapeutic effects upon the inflammatory processes or conditions. Advantageously, the compositions will contain the active ingredient in an amount of from 0.01% to 10% by weight and, preferably, contain the specific active ingredient in an amount of from about 0.1% to about 5% by weight.

The compositions of this invention are used by oral or subcutaneous route for the systemic treatment of rheumatoid arthritis, osteoarthritis and other collagen diseases in animals and humans. In view of its sustained effect, the 17-benzoate of prednisolone may be advantageously administered, as crystalline suspension or oily solution, intramuscularly or directly into arthritic joints to provide a slow release from the injection site.

When topically applied, prednisolone 17-benzoate is useful for the treatment of dermatitis of various type, psoriasis and other allergic conditions which respond to the topical application of antiinflammatory steroids. These topical compositions are usually applied to the affected sites several times daily. Other substances, such as bacteriostatic agents, antibiotics, cosmetically desirable pigments and local anesthetics may also be incorporated if these added properties or characteristics are desired.

The formulations of this inventions provide the unexpected and unobvious advantage of both local and systemic therapy. The method of this invention comprises topically or systemically administering an effective amount of prednisolone 17-benzoate incorporated in a nontoxic pharmaceutical carrier as exemplified above. The 17-benzoate of prednisolone will be advantageously administered in the systemic or topical formulations in an amount from 0.01 to 10 percent by weight, and preferably from about 0.1 to about 5 percent by weight, in equal doses one to three times daily in order to suppress or reduce the inflammatory processes and conditions.

CHEMICAL PREPARATION

To a boiling solution of 5 g of prednisolone in 500 ml of benzene, under anhydrous conditions, 5 ml of methyl orthobenzoate were added, followed by 0.5 g of pyridine p. toluensulphonate. Heating was pursued for 1 hour while a slow stream of nitrogen was passed through the solution, and about two-thirds of the solvent were removed by distillation. After addition of a few drops of pyridine, the solvent and the excess of methyl-orthobenzoate were almost completely eliminated under vacuum at moderate temperature. The residue was triturated with petroleum ether to give a crystalline isomeric mixture of 17,21-methyl orthobenzoate of prednisolone (The melting point of the analytical sample was 169°–172°C).

To a suspension of 5 g of crude orthoester in 200 ml of methanol, 80 ml of a 9 : 1 mixture of 0.1 N acetic acid and 0.1 M sodium acetate were added. The reaction mixture was refluxed for 1 hour, cooled at room temperature, and allowed to crystallize overnight. The precipitated crystals were collected, washed with water and dried to give prednisolone 17-benzoate in about 95% yield. The product showed on thin layer chromatography only one spot. After a crystallization from acetone-diethyl ether mixture, the product showed M.P. 242–244°C, $[\alpha]_D^{24} = -21.5° \pm 1.5°$ (dioxame, c = 1%).

Biological assays

The biologic effects of prednisolone 17-benzoate were evaluated in comparison with the following compounds: prednisolone free alcohol, prednisolone 17-valerate, betamethasone 17-valerate and betamethasone 17-benzoate.

1. Topical assay.

The granuloma pouch technique of Robert and Nezamis (Acta Endocr. 25,195,1957) was used to measure local anti-inflammatory activity. Female rats (Sprague - Dawley) weighing about 150 g were used and each pouch was formed with 25 ml of air prior to the introduction of 0.5 ml of a 1% solution of croton oil in corn oil. On day 5, the test compounds were injected directly into the pouch. On day 10, the animals were killed; the exudate (volume) was measured and the thymus weighed. The results of the comparison between prednisolone 17-benzoate and prednisolone free alcohol are presented in Table I.

In this assay, prednisolone 17-benzoate was approximately 50 times more effective than the parent alcohol in suppressing exudate formation and about 10 times more active in causing thymolysis.

2. Systemic assays.

The systemic anti-inflammatory and corticoid activity of prednisolone 17-benzoate was measured in various assays.

The agar granuloma test was employed according to the technique of Cresseri and Meli (Arch. Sc. Biol. 37,551,1953) for subcutaneous assay, using female Wistar rats weighing about 50 g. A small 5% agar cylinder (diameter and height: 5 mm) was implanted subcutaneously in the cranial zone of the animals, and on day 2, the test steroids were administered subcutaneously in a single dose in 0.2 ml of sesame oil solution.

The animals were sacrificed 9 or 16 days later, and granuloma and thymus were removed and weighed, these parameters being a measure of systemic corticoid activity. The results of this assay are reported in Table II.

TABLE I

| Compound into pouch | Single dose µMoles | mg | Exudate volume (ml) | Thymus mg |
| --- | --- | --- | --- | --- |
| Control | — | — | 20.2±1.32 | 275±17.1 |
| Prednisolone | 0.2 | 0.0720 | 12.0±2.19 | 276±15.2 |
|  | 1 | 0.360 | 5.4±1.05 | 243±23.0 |
|  | 5 | 1.80 | 4.4±0.80 | 115± 9.2 |
| Prednisolone 17-benzoate | 0.02 | 0.00930 | 6.3±0.94 | 278±16.7 |
|  | 0.1 | 0.0465 | 3.1±0.48 | 230±10.2 |
|  | 0.5 | 0.2325 | 2.0±0.46 | 112± 5.5 |

TABLE II

| Subcutaneous treatment | Single dose µMoles | mg | Granuloma (mg) after 1 week | 2 weeks | Thymus (mg) after 1 week | 2 weeks |
| --- | --- | --- | --- | --- | --- | --- |
| Control | — | — | 57.6±5.33 | 22.2±0.88 | 220.8±12.72 | 253.3±31.11 |
| Prednisolone | 1 | 0.360 | 48.5±5.40 | 26.3±2.64 | 112.6±10.67 | 216.1±35.49 |
|  | 5 | 1.8 | 30.2±6.12 | 20.0±1.75 | 78.1±12.20 | 191.6±18.43 |
| Prednisolone 17-benzoate | 1 | 0.465 | 26.5±4.26 | 19.7±1.57 | 26.1± 1.50 | 99.0±10.81 |
|  | 5 | 2.325 | 13.9±1.11 | 14.2±1.17 | 17.7± 2.44 | 13.4± 1.85 |

The results reported in Table II show that a single subcutaneous dose of prednisolone 17-benzoate strongly reduces the capsule value and the thymus weight of the treated animals for 2 weeks while prednisolone induces some reduction versus controls only for 1 week and at a dose 5 times higher.

When tested under the same conditions, betamethasone 17-benzoate and betamethasone 17-valerate did not show any increase in the systemic activity over betamethasone free alcohol.

The oral activity of prednisolone 17-benzoate was determined in the granuloma pouch test and compared with that of prednisolone 17-valerate and the parent alcohol. The compounds were administered to rats in a single oral dose, 4 days after the pouch formation. The animals were sacrificed 5 days later and the exudate volume was measured. The data presented in Table III show that the 17-benzoate of prednisolone is at least 5 times more effective than the standard (prednisolone) in suppressing exudate formation while the corresponding 17-valerate is about as active as the standard.

TABLE III

| Oral treatment | Single dose | | % Exudate suppression |
|---|---|---|---|
| | μMoles | mg | |
| Prednisolone 17-benzoate | 2 | 0.930 | 32 |
| | 10 | 4.65 | 42 |
| Prednisolone 17-valerate | 2 | 0.890 | 10 |
| | 10 | 4.45 | 28 |
| Prednisolone | 2 | 0.720 | 16 |
| | 10 | 3.60 | 24 |

When tested orally, under the same conditions, betamethasone 17-benzoate and betamethasone 17-valerate were found less active than the parent free alcohol.

The systemic effect of prednisolone 17-benzoate was also measured by the thymolytic assay using the procedure described by Ringler and Brownfield (Endocrinol. 1960,66,900). Female rats weighing approximately 60 g received a single oral or subcutaneous treatment. The animals were sacrificed at different time (2, 4 or 8 days) after the administration and the thymus weights were meausred and compared with prednisolone free alcohol.

The results of this assay indicate that the 17-benzoate of prednisolone, subcutaneously administered, has from 10 to 13 times the thymolytic activity of the parent alcohol. The oral activity is 4 - 7 times higher than the standard.

No appreciable difference has been noted between betamethasone 17-benzoate and betamethasone free alcohol in the thymolytic assay after subcutaneous administration while, by oral route, betamethasone 17-benzoate appears less active than the parent compound.

3. Survival rate in adrenalectomized rats.

Immature female rats were adrenalectomized under ether anesthesia and 24 hour after were given a single subcutaneous dose of the test steroids. The animals were fed and maintained on distilled water ad libitum. A single subcutaneous injection of 1 mg of prednisolone 17-benzoate was capable to increase of 21 days the survival time over that of the controls while the same dose of betamethasone 17-benzoate increased the survival time of 9 days only.

Thus, prednisolone 17-benzoate is significantly more effective than betamethasone 17-benzoate as mineralocorticoid agent.

The following examples are given to illustrate the pharmaceutical formulations of this invention.

EXAMPLE 1

A cream for external use is prepared having the following composition:

| Components | Percent (%) By Weight |
|---|---|
| Prednisolone 17-benzoate | 0.1 |
| Propylparaben | 0.02 |
| Methylparaben | 0.03 |
| Sodium laurylsulphate | 1.00 |
| Propylene glycol | 12.00 |
| Stearyl alcohol | 15.00 |
| White soft paraffin | 12.50 |
| Liquid paraffin | 22.50 |
| Distilled water | 36.85 |

Melt the stearyl alcohol and the white soft paraffin on a steam bath, and warm to about 75°C, add a solution of the active ingredient in the propylene glycol, then the other ingredients, previously dissolved in the water and warmed to 75°C. Stir the mixture until it congeals.

In the above cream sodium laurylsulphate can be replaced by polyoxyl 40 stearate in an amount of 5% by weight.

EXAMPLE 2

An ointment for external use is prepared having the following composition:

| Components | Percent (%) By Weight |
|---|---|
| Prednisolone 17-benzoate | 0.20 |
| Lanolin | 14.60 |
| Liquid paraffin | 17.80 |
| White soft paraffin | 67.40 |

Add the active product to the other ingredients previously melted at 75°C and refine twice.

EXAMPLE 3

An ophthalmic ointment is prepared having the following composition:

| Components | Percent (%) By Weight |
|---|---|
| Prednisolone 17-benzoate | 0.20 |
| Beeswax | 5.00 |
| White soft paraffin | 94.80 |

Melt the beeswax and the white paraffin at 70°C, add the active ingredient, refine twice and distribute into sterile tubes.

EXAMPLE 4

Lotion having the following composition:

| Components | Percent (%) By Weight |
|---|---|
| Prednisolone 17-benzoate | 0.10 |
| Ethyl alcohol 95° | 30.00 |
| Glycerol | 10.00 |
| Propylene glycol | 40.00 |
| Distilled water | 19.90 |

Dissolve the active product in the alcohol and add the solution to a clear mixture of the other ingredients.

EXAMPLE 5

Tablets having the following composition:

|  | mg |
| --- | --- |
| Prednisolone 17-benzoate | 2.00 |
| Lactose spray dried | 97.50 |
| Magnesium stearate | 0.50 |

Pass the spray dried lactose through a No 60 B.S. mesh sieve. Dissolve the active ingredient in about 0.03 cc of ethyl alcohol 95°. Add the clear solution to the sieved lactose, mix well and let the solvent evaporate at room temperature in the usual manner. Add the magnesium stearate to the dried mass, mix again and compress into tablets on 6 mm diameter bisected punches.

EXAMPLE 6

In the same manner as above, there are prepared tablets having the following composition (mg):

| Lactose spray dried | 89.3 |
| --- | --- |
| Calcium stearate | 0.5 |
| Prednisolone 17-benzoate | 10.0 |

Calcium stearate may be replaced by magnesium stearate. Similarly, placebo granules may be employed in the above composition instead of lactose. The placebo granules are made of 50% lactose and 50% rich starch.

EXAMPLE 7

A parenteral aqueous suspension is prepared having the following composition:

| Components | Parts By Weight (mg/ml) |
| --- | --- |
| Prednisolone 17-benzoate | 5 |
| Polyethylene glycol 4000 U.S.P. | 30 |
| Polysorbate 80 U.S.P. | 5 |
| Buffer system | as desired |
| Water for injection | to desired volume |

The above ingredients are suspended in water and the suspension is then autoclaved to render is sterile.

EXAMPLE 8

Preparation for intramuscular or intra-articular injection has the following composition:

| Prednisolone 17-benzoate | 10 mg/ml |
| --- | --- |
| Polyethylene glycol 6000 U.S.P. | 20 mg/ml |
| Myristyl Picolinium chloride | 5 mg/ml |
| Water for injection | to desired volume |

EXAMPLE 9

An oily solution for parenteral use containing 2.5 mg of prednisolone 17-benzoate in 2 ml oil is prepared by dissolving 1.25 g of the active ingredient in one liter sesame oil and transferring the solution into suitable sized sterile vials under aseptic conditions.

In the same manner, the active ingredient is dissolved in 500 cc mixture (1:1) of sesame oil and olive oil and the limpid solution filled into sterile 2 ml vials, so that each vial contains exactly 5 mg of prednisolone 17-benzoate.

We claim:

1. A pharmaceutical composition for use in the systemic treatment of inflammatory conditions comprising prednisolone 17-benzoate in association with a systemic pharmaceutical carrier.

2. A composition as claimed in claim 1 containing from 0.01 to 10 percent by weight of said steriod.

3. A composition as claimed in claim 1 containing from about 0.1 to about 5 percent by weight of said steroid.

4. A method of treating inflammatory conditions which comprises the systemic administration of an effective amount of prednisolone 17-benzoate incorporated in a pharmaceutical carrier.

5. A method as claimed in claim 4 wherein from 0.01% to 10% by weight of said steroid is used.

6. A method as claimed in claim 4 wherein from 0.1% to 5% by weight of said steroid is used.

* * * * *